United States Patent Office 3,310,603
Patented Mar. 21, 1967

3,310,603
ADHESIVE COMPOSED OF POLYEPOXIDE AND A CHLOROPRENE COPOLYMER WITH 5 TO 25% ACRYLONITRILE
Douglas Jerome Kelly, Wilmington, Del., assignor to E. I. du Pont de Nemours and Company, Wilmington, Del., a corporation of Delaware
No Drawing. Filed Sept. 13, 1963, Ser. No. 308,652
7 Claims. (Cl. 260—837)

This invention relates to a new composition of matter. In particular, it concerns homogeneous blends of chloroprene/acrylonitrile copolymers and epoxy resins. These blends are useful as adhesive compositions.

It is known that valuable adhesives for bonding fabric to metal, fabric to wood, metal to rubber, and metal to metal can be made from compositions comprising polychloroprene (i.e., homopolymers of chloroprene), an epoxy resin having on the average more than one epoxy group per molecule, and a chemical hardening agent for the epoxy resin. Unfortunately, these blends of polychloroprene and epoxy resins sometimes are in adequate for certain applications. The range of epoxy resin which can be used most advantageously is restricted by the very limited compatibility of the resin with polychloroprene. This problem is particularly acute in the case of the higher molecular weight epoxys which are normally solid at room temperature; since these are normally incompatible with polychloroprene, it has been necessary to select for use therewith only the lower molecular weight epoxy resins which are liquid at room temperature to achieve outstanding results. Mixtures containing high proportions of liquid epoxy resins with polychloroprene have displayed little or no tack. Uncured epoxy compositions containing small proportions of polychloroprene behave as oily Newtonian fluids whose tendency to fluid flow has restricted its suitablility for many adhesive applications. In general the epoxy resin shows no change in properties as a result of the polychloroprene present. Compositions containing comparable amounts of polychloroprene and epoxy resin have been unsatisfactory on account of the partial incompatibility of the polychloroprene; the low tack and the need for curing these compositions have adversely affected their acceptance as uncured pressure-sensitive adhesives.

Since mixtures of epoxy resin with chloroprene homopolymers have the above-described disadvantages and, further, since it has been reported that mixtures of epoxy resins with nitrile rubbers exhibit many serious disadvantages, it is quite surprising that pressure-sensitive adhesive compositions exhibiting good tack, flow resistance, bond flexibility and peel strength can be prepared from mixtures of (I) a plastic sol copolymer of chloroprene containing from about 5 to 25 weight percent acrylonitrile units, and (II) an epoxy resin compound containing at least two epoxy groups per molecule, the amount of epoxy resin compound ranging from about 5 to 95 weight percent of said mixture. The epoxy resin is either (a) a polyglycidyl ether of a polyhydric phenol or alcohol, or (b) an epoxidized long-chain fatty acid ester having 15–22 carbons.

The choloroprene copolymers which are employed in the present invention are sol polymers, that is, polymers which can be brought into solution in contrast to gel polymers which cannot be dissolved. The chloroprene copolymers are also characterized in having about 5–25% by weight of incorporated acrylonitrile units. Units of a third monomer may also be present providing the amount and character thereof do not deleteriously affect the desired properties of the copolymer.

These chloroprene copolymers can be made by free radical catalyzed emulsion copolymerization in accordance with the general procedures set out in Wagner, U.S. Patent 2,395,649 and the following general references: Copolymerization, T. Alfrey, Jr., J. J. Bohrer, and H. Mark, Interscience Publishers, Inc., New York, 1952; Emulsion Polymerization, F. A. Bovey, I. M. Kolthoff, A. I. Medalia and E. J. Meehan, Interscience Publishers, Inc., New York, 1955; and R. Simha and L. T. Wolf, J. Research Natl. Bur. Standards, vol. 31, page 521 (1948).

A wide variety of epoxy resins can be employed in the present invention. In contrast to the polychloroprene/epoxy resin compositions of the prior art, many solid epoxy resins can be present. One of the types of epoxy resins which may be employed in the present invention is derived from polyhydric phenols and polyfunctional coupling agents such as polyhalohydrins, polyepoxides or epihalohydrins. These compositions may be described as polymeric polyhydric alcohols having alternate aliphatic chains and nuclei connected by ether links, containing terminal epoxy groups and being free from functional groups other than epoxy and hydroxyl groups. Preparation of these materials as well as illustrative examples are described in U.S. Patents 2,456,408; 2,503,726; 2,615,007; 2,615,008; 2668807; 2668,805 and 2,698,315. These structures are often based on bisphenol-A which is 2,2-bis (4-hydroxyphenyl) propane. Two typical resins are illustrated below:

(A)
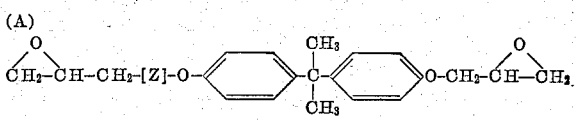

wherein

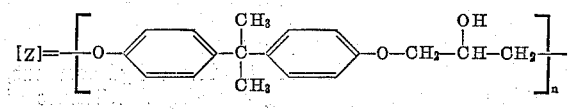

(B)
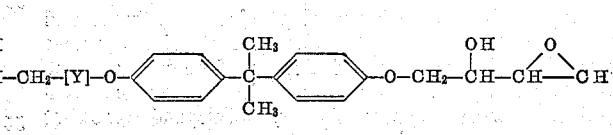

wherein

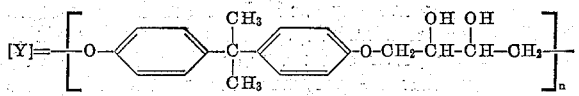

wherein $n$ is an integer including zero and may be as high as 35. The value of $n$ indicates the degree of polymerization and it depends on the molar ratio of reactants. The first of these compounds is derived from epichlorohydrin or α-glycerol dichlorohydrin. The second compound is derived from butadiene dioxide.

Another useful type of epoxy resin which may be employed includes the epoxidized unsaturated natural esters, said unsaturated esters being derived from vegetable, animal and fish oils. These esters are made from long chain acids containing from 15–22 carbons. The acid may be esterified with simple alcohols or with polyhydric alcohols such as glycerol, pentaerythritol and others. Mixed esters may also be used. These esters contain an average of from 2 to about 20 epoxy groups per molecule. The epoxide groups are formed by reaction with various organic peroxides, peroxy acids or a form of hydrogen peroxide. A typical example of this product is an epoxidized soybean oil having an epoxide equivalent weight of 263, an acid value of 1, a viscosity of 3.3 Stokes at 25° C. and an average molecular weight of 937. Such products are not pure and vary somewhat in character depending on reactant proportions, reaction times and temperatures. The preparation of a large number of such mixed polyepoxides is described in U.S. Patents 2,538,072, 2,581,464 and 2,712,000. For purposes of the present invention, there is no preferred epoxy starting material.

The compositions of the present invention can be made using any of the conventional compounding equipment such as rubber roll mills, Banbury mixers, churns, dissolvers and the like. The order of mixing is not critical. For many applications, other components may be added to the mixture prior to use; thus the chloroprene copolymer may contain curing agents such as magnesium oxide and zinc oxide. Although curing agents are not needed, they may be added as stabilizers to provide long term durability of the adhesive film and as acid acceptors to protect acid-sensitive substrates. While these copolymer reagents may be added at any time, it is frequently convenient to introduce them into the copolymer on a rubber roll mill, or the like before the copolymer is mixed with the epoxy resin. It is not critical that a hardening agent for the epoxy resin be present. For example, pressure-sensitive mastics do not need an epoxy hardener. For some applications, e.g., structural, requiring high shear strength or resistance to flow, it is advantageous to use a small amount of one of the customary epoxy resin curing agents. Mixtures containing a high proportion of epoxy resin may require the addition of a hardening agent for best results. A representative hardening agent is tris (dimethylaminomethyl)phenol. Any of the amines or mixtures of amines, customarily used for curing epoxy resins, can be employed here. The use of 10 parts of hardening agent for each 100 parts by weight of epoxy resin is common.

If a very large amount of hardening agent is employed, it may interact with the active halogen on the chloroprene copolymer. Such interaction is usually useful.

For many adhesive applications it is desirable to employ a volatile solvent. A representative and preferred solvent is methyl ethyl ketone. Other liquid media can be employed such as aromatic and chlorinated hydrocarbons, naphthenic petroleum solvents, and esters. Mixtures of solvents can be employed.

The relative proportion of chlorophene copolymer and epoxy resin in the homogeneous mixtures of the present invention can vary over a wide range. The compatability of the chloroprene copolymer and the epoxy resin, for a particular chloroprene copolymer, will depend somewhat on the molecular weight of the epoxy resin. The lower the molecular weight of the epoxy resin, the greater the compatibility; conversely, the higher the molecular weight, the less the compatability. Compositions containing chloroprene copolymer are much more compatible with epoxy resins than are polychoroprenes. This advantage becomes particularly noticeable for compositions having more than 10% epoxy resin by weight. As the proportion of epoxy resin is increased, polychloroprene becomes incompatible with all but the lowest molecular weight epoxy resins. In contrast, the chloroprene copolymer exhibits a markedly greater compatability which only begins to fall off noticeably for compositions having more than about 70% or more epoxy resin by weight. Throughout the entire range of composition the copolymer displays far better compatibility with the epoxy resins than does the polychloroprene.

The addition of small amounts of the compatible copolymer to liquid epoxy resins changes them from oily Newtonian fluids having no cohesive strength to tacky thixotropic fluids which resist shear forces while retaining an ability to wet surfaces. Similar low concentrations of polycholorprene cause no such effect. The mixtures of the present invention develop high tack in contrast to those made from epoxy resins and polychloroprenes; if no curing agent for the epoxy resin is added, much of this tack is retained for periods in excess of 3 months at 75° F. and 6 weeks at 50° C. in air. The mixtures of the present invention containing 5–40% by weight of the copolymer give a bond of excellent flexibility and shear strength. If chloroprene homopolymer were substituted for the copolymer over this range of composition, the mixture would have the same low amount of tack as that of the pure epoxy resin and would display no improvement in uncured strength. The mixture containing 30–55% by weight of the copolymer are useful as uncured pressure-sensitive adhesives. Films of these adhesives exposed to atmospheric moisture for 3 months in the open at room temperature retained their tack and had enough cohesive strength to tear paper under peeling stress. Mixtures containing a similar proportion of epoxy resin but employing polychloroprene in place of the chloroprene copolymer exhibit low tack and are not pressure-sensitive adhesives. When the mixtures of the present invention contains a major proportion of the chloroprene copolymer, the epoxy resin, if uncured, acts as a stabilizer (acid acceptor) and, if fluid, provides plastization or, if solid, supplies reinforcement. When the epoxy resin is cured, it reinforces the copolymer and improves its adhesion to substrates such as metal or fabric. Those skilled in the art can determine the amount of copolymer needed for a particular application by empirical testing. The solid higher molecular weight epoxy resins will be less compatible than the liquid lower molecular weight epoxy resins. Compatibility will improve in general as the proportion of epoxy resin in the composition decreases. Other factors being equal, the compatibility will decrease as the proportion of acrylonitrile units in the chloroprene copolymer decreases. Those skilled in the art can take these factors into account when preparing compositions for a particular purpose.

The invention will now be described with reference to the following examples of specific embodiments thereof wherein parts and percentages are by weight unless otherwise specified.

EXAMPLE I

Chloroprene copolymer

The chloroprene copolymer made in accordance with the directions of U.S. Patent 2,395,649 by free radical catalyzed emulsion copolymerization of chloroprene and acrylonitrile, contained 20% by weight of acrylonitrile monomer units.

Copolymer stock 100 parts of the chloroprene copolymer were compounded on a rubber roll mill with 4 parts of magnesium oxide, 5 parts of zinc oxide, and 2 parts of 4,4'-thiobis(2-tert-butyl-5-methylphenol) antioxidant.

Epoxy resin ("Epon 828")

The epoxy resin ("Epon 828") made by the reaction of epichlorohydrin and 2,2'-bis(4-hydroxylphenyl)propane had a molecular weight of 400 and contained 5 milliequivalents of epoxide groups per gram of resin.

Preparation of adhesive compositions

Seven adhesive compositions were prepared according to the following recipes:

| Component | A | B | C | D | E | F | G |
|---|---|---|---|---|---|---|---|
| Epoxy resin | 10 | 25 | 35 | 50 | 65 | 75 | 90 |
| Copolymer stock | 100 | 83 | 72 | 56 | 39 | 28 | 11 |
| Methyl ethyl ketone | 270 | 225 | 195 | 150 | 105 | 75 | 30 |

The epoxy resin and the chloroprene copolymer stock were dissolved at room temperature (25–30° C.) in methyl ethyl ketone to give homogeneous solutions.

*Application of the adhesive compositions*

(1) *Dead weight—uncured adhesive.*—A dead weight test was conducted to find the load supported by these uncured compositions. The adhesive solutions were cast (one coat) on polyethylene terephthalate strips one inch wide and six inches long to depth of six mils (about 2 mils when solvent-free). Films spread with the same adhesive were combined with a hand roller to produce a one square inch overlap. These laminates were immediately subjected to a shear stress at 25° C. to determine the load in grams necessary to cause creep. The results were as follows:

TABLE I

|  | A | B | C | D | E | F | G |
|---|---|---|---|---|---|---|---|
| Test time, 15 min.: | | | | | | | |
| Min. dead wt. (g.) for flow | 7,000 | 5,000 | 4,000 | 1,000 | 500 | 20 | |
| Max. dead wt. (g.) for no flow | 5,000 | 4,000 | 2,500 | 500 | 300 | 15 | |
| Test time, 3 hrs.: | | | | | | | |
| Min. dead wt. (g.) for flow | | 4,000 | 2,000 | 700 | ¹ 150 | | ¹ 15 |
| Max. dead wt. (g.) for no flow | 4,000 | 2,000 | 1,500 | 500 | | | |

¹ Slight flow—10% slipping.

(2) *Peel test.*—Compositions 1 through 7 were mixed with various amounts of tris(dimethylaminomethyl)-phenol hardening agent:

Hardener — Parts
A ------------------------------------------- 0.6
B ------------------------------------------- 1.6
C ------------------------------------------- 2.0
D ------------------------------------------- 3.0
E ------------------------------------------- 4.0
F ------------------------------------------- 4.5
G ------------------------------------------- 5.4

Single coats of the resulting compositions 6-mils thick (corresponding to 2 mils when solvent-free) were brushed on canvas and on degreased acid-cleaned aluminum. After the solvent had been allowed to evaporate for 20 minutes at 25° C., the canvas was rolled onto the aluminum. Each test specimen was kept for 14 days thereafter at 25° C. The peel strengths of the resulting bonded articles were then measured by ASTM Procedure D903–49 (modified in that the peel rate was 2 inches/minute instead of 12 inches/minute). The following data were obtained:

Peel strength (l./linear inch)
A ------------------------------------------- 14
B ------------------------------------------- 21
C ------------------------------------------- 51
D ------------------------------------------- 33
E ------------------------------------------- 14
F ------------------------------------------- 12

(3) *Shear strength.*—Shear strength specimens were prepared by painting the adhesive compositions containing tris(dimethylaminamethyl)phenol on two pieces of degreased, acid-cleaned aluminum. After a 20-minute period of solvent evaporation the two pieces were clamped to create a lap joint and allowed to cure for 13 days at 25° C. They were then tested as outlined in ASTM Procedure D1002–53T with two exceptions. A one square inch overlap was used and the separation rate during testing was 2 inches per minute.

The following shear strengths were obtained:

Shear strength (lb./sq. in.)
A ------------------------------------------- 30
B ------------------------------------------- 25
C ------------------------------------------- 73
D ------------------------------------------- 80
E ------------------------------------------- 940
F ------------------------------------------- 1183
G ------------------------------------------- 664

EXAMPLE II

Adhesive compositions C and F, prepared without catalyst according to the procedure of Example I above, exhibited the following storage stability:

TABLE IIa

| | Viscosity (cps.) | |
|---|---|---|
| | C | F |
| Original (25° C.) | 2,500 | 2,600 |
| 2 weeks (25° C.) | 3,200 | 2,000 |
| 3 weeks (25° C.) | 3,800 | 2,200 |
| 6 weeks (25° C.) | 3,900 | 2,500 |
| 1 week (50° C.) | 4,500 | 2,800 |
| 3 weeks (50° C.) | Gel | 5,400 |
| 4 weeks (50° C.) | | 7,800 |
| 5 weeks (50° C.) | | 11,300 |

The adhesive compositions were mixed with a higher level of tris(dimethylaminomethyl)phenol (3.5 and 7.5 parts) as described in Example I and applied to canvas. The coated canvas was clamped against aluminum which had been degreased and acid-cleaned. The following peel adhesion results were obtained:

TABLE IIb

| Cure conditions | Test Temp. (° C.) | Peel Adhesion (lb./linear inch) | |
|---|---|---|---|
| | | C | F |
| 16 hours/70° C | 25–30 | 24 | 31 |
| 3 days/room temp | 25–30 | 18 | 11 |
| 10 days/room temp | 25–30 | 27 | 10 |
| 10 days/room temp | 100 | 8 | 7 |

The shear adhesion of aluminum to aluminum was measured by painting an aluminum sheet with adhesive compositions C and F and thereafter curing without applicational pressure for the times and temperatures stated hereafter. The following results were noted:

TABLE IIc

| Cure conditions | Test Temp. (° C.) | Shear Strength (lb./linear inch) | |
|---|---|---|---|
| | | C | F |
| 16 hours/70° C | 25–30 | 1,000 | 1,565 |
| 10 days/room temp | 25–30 | 886 | 1,568 |
| 10 days/room temp | 100 | | 561 |

Thus it is seen that for the same adhesive compositions an increase in curing agent (as employed in Example II) leads to bonds having greatly increased shear strength but decreased peel adhesion.

EXAMPLE III

Adhesive compositions C to F, made according to the procedure of Example I, were stirred with the following various amounts of tris(dimethylaminomethyl)phenol hardening agent:

| Hardener | Parts |
|---|---|
| C | 3.3 |
| D | 4.4 |
| E | 4.2 |
| F | 4.5 |

The resulting compositions were brushed on steel and aluminum, allowed to dry for 20 minutes. The coated metal was then laminated to chlorosulfonated polyethylene film by heating in a press for 90 seconds at 300° F. and 175 lbs./sq. in. pressure and thereafter cured for 3 days at room temperature (25–30° C.). The adhered assemblies which resulted exhibited the following peel adhesion at 25–30° C. These tests were conducted according to ASTM–D903–49 except that the separation speed was 2 in./min.

TABLE IIIa

| | Peel Strength (lb./linear inch) | | | |
|---|---|---|---|---|
| | C | D | E | F |
| Percent copolymer in mixture of copolymer and epoxy resin | 65 | 50 | 35 | 25 |
| Metal: | | | | |
| Phosphate-treated steel [1] | 30 | 10 | 45 | 65 |
| Galvanized steel | 30 | 40 | 40 | 60 |
| Aluminum [2] | 50 | 70 | 50 | 60 |

[1] Phosphate-treated steel: This type of steel is termed "Bonderized"; the process of "Bonderizing" is described in the article by V. M. Darsey, Industrial and Engineering Chemistry, vol. 27, page 1142 (1935).
[2] Aluminum: A treated aluminum called "alodine" (trademark of Amchem Products Company); the treating process, utilizing a bath of chromic acid, phosphoric acid, and hydrofluoric acid, is described in the article by A. Douty and F. P. Spruance in Proc. Am. Electroplaters Soc., vol. 36, page 193 (1949).

The cured laminates prepared above were boiled in water at 100° C. for 3 hours and tested at room temperature while still wet. The following peel strengths (lbs./linear inch) were obtained:

TABLE IIIb

| | C | D | E | F |
|---|---|---|---|---|
| Metal: | | | | |
| Phosphate-treated steel | ½ | 2 | 2 | ½ |
| Galvanized steel | 11 | 4 | 4 | 5 |
| Aluminum | 35 | 8 | 4 | 20 |

EXAMPLE IV

*Copolymer stock*

100 Parts of the chloroprene copolymer of Example I were compounded on a rubber roll mill with 8 parts of magnesium oxide and 2 parts of 2,6-di-tert-butyl-4-methylphenol antioxidant.

*Preparation of adhesive composition*

A homogeneous adhesive composition having a 20% solids content was prepared by mixing the following components at 25–30° C.:

| Component | Parts by weight |
|---|---|
| Copolymer stock | 110 |
| Epoxy resin of Example I | 100 |
| Toluene | 840 |

Test pieces were made by spreading adhesive films 1 inch wide by 6 inches long by 0.001 inch thick on one end of cellophane strips 2 inches wide by 12 inches long by 0.0015 inch thick by the use of a 10-mil spreading cup. To measure the tack retention characteristics of the adhesives, the coated strips were allowed to age before being bonded. Some specimens were kept at 25–30° C., others were held at 50° C.; the Table IV below gives the details.

Steel panels 6 inches long by 2 inches wide by one-sixteenth inch thick were treated by grinding the metal surface with fine sandpaper and then cleansing it with 1,1,2-trichloro-1,2,2-trifluoroethane.

Bonding was accomplished by pressing the coated strips on the clean metal surface with a 4.25-lb. rubber roller which was passed once forward and backward. The roller weight was the sole pressure.

After the bonding, the assemblies aged at 25–30° C. were immediately tested. Those aged at 50° C. were conditioned at 25–30° C. and 50% relative humidity for 3 hours before being tested. This conditioning is necessary to restore the properties of the cellophane supporting tape which becomes somewhat brittle during the aging.

Table IV below gives the data. The 180° peel adhesion tests were run on an Instron machine set at 12 in./min. head speed. The "quick grab test" consists in testing 90° peel adhesion at 12 in./min. coated and dried strips which have been merely placed on the metal panel without application of pressure.

The "Test Method for Pressure Sensitive Tapes" developed by the Specifications and Technical Committee of the Pressure Sensitive Tape Council, Glenview, Illinois, was used.

TABLE IV

180° Peel Adhesion (pli.)—Strips aged at 25–30° C. before bonding for:

| | |
|---|---|
| 4 hours | 3.1 |
| 1 day | 4.0 |
| 3 days | 3.0 |
| 1 week | 0.75 |
| 2 weeks | 4.5 |
| 3 weeks | 3.25 |

180° Peel Adhesion (pli.)—Strips aged at 50° C. before bonding for:

| | |
|---|---|
| 4 hours | 3.7 |
| 1 day | 2.25 |
| 3-days | 3.5 |
| 1 week | 0.01 |
| 2 weeks | 2.0 |
| 3 weeks | 2.5 |

180° Peel Adhesion (pli.)—Strips dried for 16 hrs. at 50° C., then bonded to steel and aged at 50° C. for:

| | |
|---|---|
| 1 day | 5.0 |
| 3 days | 5.0 |
| 1 week | 5.0 |
| 2 weeks | 4.0 |
| 3 weeks | 6.0 |

Quick Grab Test (pli.) _____ 0.25

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:
1. A high-tack, pressure-sensitive adhesive composition consisting essentially of a homogeneous mixture of (I) a plastic sol copolymer of chloroprene containing from about 5 to 25 weight percent acrylonitrile units, and (II) an epoxy resin compound containing at least two epoxy groups per molecule, the amount of epoxy resin compound ranging from about 5 to 95 weight percent of said mitxure, said epoxy resin selected from the group consisting of (a) polyglycidyl ethers of polyhydric phenols and alcohols, and (b) epoxidized long-chain fatty acid esters having 15 to 22 carbons.

2. A composition as defined in claim 1 wherein said epoxy resin compound is an epoxidized natural ester of unsaturated acids of from about 15 to 22 carbon atoms, said compound having from 2 to about 20 epoxy groups per molecule, the amount of said compound ranging from about 10 to 70 weight percent of said mixture.

3. A composition as defined in claim 1 wherein said epoxy compound is the reaction product of a polyhydric phenol with a coupling agent selected from the group consisting of polyhalohydrins, polyepoxides and epihalohydrins, the amount of said compound ranging from about 10 to 70 weight percent of the mixture.

4. A composition as defined in claim 3 wherein said epoxy compound is the reaction product of epichlorohydrin and 2,2′-bis(4-hydroxylphenyl)propane.

5. An adhered composite article comprising a metal surface bonded to a fabric by an adhesive comprising the composition of claim 1 and a curing agent.

6. A high-tack, pressure sensitive adhesive composition exhibiting high bond flexibility and peel strength consisting essentially of a mixture of (I) a plastic sol copolymer of chloroprene containing from about 5 to 25 weight percent acrylonitrile units, and (II) an epoxy resin compound containing at least two epoxy groups per molecule, the amount of copolymer ranging from about 5 to 40 weight percent of said mixture, said epoxy resin selected from the group consisting of (a) polyglycidyl ethers of polyhydric phenols and alcohols, and (b) epoxidized long-chain fatty acid esters having 15 to 22 carbons.

7. An uncurred high-tack pressure-sensitive adhesive composition consisting essentially of a mixture of (I) a plastic sol copolymer of chloroprene containing from about 5 to 25 weight percent acrylonitrile units, and (II) an epoxy resin compound containing at least two epoxy groups per molecule, the amount of copolymer ranging from about 30 to 55 weight percent of said mixture, said epoxy resin selected from the group consisting of (a) polyglycidyl ethers of polyhydric phenols and alcohols, and (b) epoxidized long-chain fatty acid esters having 15 to 22 carbons.

References Cited by the Examiner

UNITED STATES PATENTS

| | | | |
|---|---|---|---|
| 2,886,473 | 5/1959 | Schroeder | 260—837 |
| 3,144,428 | 8/1964 | Kost | 260—837 |

MURRAY TILLMAN, *Primary Examiner.*

P. LIEBERMAN, *Assistant Examiner.*